United States Patent [19]

Inoue et al.

[11] Patent Number: 4,892,419
[45] Date of Patent: Jan. 9, 1990

[54] LUBRICATED BEARING APPARATUS FOR HYDRAULIC MACHINERY

[75] Inventors: Hisao Inoue, Hitachi; Ichiro Hitomi, Katsuta; Osamu Sugimoto, Suita; Teiji Horita, Hikone, all of Japan

[73] Assignees: Hitachi, Ltd., Tokyo; The Kansai Electric Co., Inc., Osaka, both of Japan

[21] Appl. No.: 206,048

[22] Filed: Jun. 13, 1988

[30] Foreign Application Priority Data

Jun. 15, 1987 [JP] Japan ............................ 62-147108

[51] Int. Cl.$^4$ .................... F16C 33/10; F16C 17/02
[52] U.S. Cl. .................................... 384/322; 384/280; 384/297; 384/907.1
[58] Field of Search ............. 384/276, 280, 281, 295, 384/297, 309–312, 315, 322, 907.1

[56] References Cited

U.S. PATENT DOCUMENTS

| | | | |
|---|---|---|---|
| 2,702,730 | 2/1955 | Ivanoff et al. | 384/309 |
| 3,542,441 | 11/1970 | Nixon | 384/312 |
| 4,410,285 | 10/1983 | Strasser et al. | 384/297 X |
| 4,664,595 | 5/1987 | Tsuji et al. | 384/297 X |

FOREIGN PATENT DOCUMENTS

| | | | |
|---|---|---|---|
| 637160 | 2/1962 | Canada | 384/295 |
| 5122954 | 2/1976 | Japan. | |
| 60-81517 | 5/1985 | Japan. | |
| 60-88215 | 5/1985 | Japan. | |

Primary Examiner—Thomas R. Hannon
Attorney, Agent, or Firm—Fay, Sharpe, Beall, Fagan, Minnich & McKee

[57] ABSTRACT

A lubricated bearing apparatus for a hydraulic machinery has rotary-side ceramic sliding plates disposed in contact with bearing-side ceramic sliding plates. The rotary-side ceramic sliding plates are disposed in receiving grooves of a main shaft sleeve member fixed to the main shaft. The main shaft sleeve member is provided with preventing portions for preventing the rotary-side ceramics sliding plates from being broken by the centrifugal force. Thus, ceramic materials can be used both on the rotary side and the bearing side, thereby lengthening the usable life of the bearing apparatus.

9 Claims, 4 Drawing Sheets

LUBRICATED BEARING APPARATUS FOR HYDRAULIC MACHINERY

BACKGROUND OF THE INVENTION

1. Field of the Invention

The present invention relates to a water-lubricated bearing apparatus for hydraulic machinery.

2. Description of the Prior Art

Hydraulically operated turbines, in particular such large-scaled turbines as hydraulic turbines and reversible pump-turbines, are in general provided with a group of guide vanes disposed around a runner, so that water flowing into the turbine is guided to the runner with its quantity being controlled, so as to rotate and drive the runner. The rotation of the runner is transmitted to the generator via a main shaft to thereby generate electricity. The main shaft is provided with a guide bearing in order to prevent any vibration of the runner, the generator and the main shaft during their operation and thus to attain their stable rotation.

The structure of a conventional guide bearing will be explained with reference to FIG. 1 illustrating the structure of an oil-lubricated bearing which is a typical known guide bearing and is used in, for example, a Francis turbine.

A guide vane 1 is disposed between an upper cover 2 and a lower cover 3. A runner 4 is disposed within the space defined by the covers 2 and 3 at a location downstream of the guide vane 1. The runner 4 comprises a runner crown 5 closer to the upper cover 2, a runner blade 6, and a runner band 8 closer to the lower cover 3.

The runner 4 is mounted on a main shaft 9 extending upward from the runner 4, in the following manner. The runner crown 5 is brought into contact with a flange portion 10 formed on the main shaft 9 and a bolt 11 is threaded, so as to connect the runner crown 5 and the flange portion 10 together, thereby mounting the runner 4 on the tip portion of the main shaft 9. A water sealer 12 is provided, which extends from the upper cover 2 toward the bolt 11 and surrounds the main shaft 9 with a gap therebetween. A part of the main shaft 9 which is above the water sealer 12 is formed with a main shaft skirt 16 at a position partially determining an overhung dimension H (described later). The main shaft skirt 16 is enclosed by an oil tank 17.

One edge portion of the oil tank 17 is disposed in a groove 16A formed in the main shaft skirt 16 on the side thereof closer to the water sealer 12, while the other edge portion of the oil tank 17 is disposed in correspondence with a part of the main shaft 9 which is above the main shaft skirt 16. These portions of the oil tank 17 are integrated by an intermediate body surrounding the main shaft skirt 16, thereby forming the oil tank 17. A flange portion 17A is formed on the outer periphery of the oil tank 17. The flange portion 17A is brought into contact with a flange portion 2C of a supporting portion 2B extending upward from the upper cover 2, and they are fastened by a fastener (not shown), whereby the flange portion 17A of the oil tank 17 is supported by the flange portion 2C of the upper cover 2. The inside of the oil tank 17 is filled with lubricating oil 18, and a bearing apparatus 20 is disposed within the oil tank 17.

The bearing apparatus 20 has a supporting portion 20A mounted on the inner periphery of the oil tank 17 at a position corresponding to the flange portion 17A. The supporting portion 20A opposes the main shaft skirt 16 nd is provided with adjusting bolts 21 (only one of which is shown). The adjusting bolts 21 press against and thus support a segment bearing 22 which in turn presses against the main shaft skirt 16.

When the runner 4 and the main shaft 9 rotate, the main shaft skirt 16 also rotates as it slides on the segment bearing 22. Frictional heat generated during this sliding rotation is cooled by the lubricating oil 18. Part of the oil heated is cooled by cooler tubes 23.

The overhung dimension H is a distance which is inevitably necessary for the purposes of, for instance, enabling the maintenance of the sealer 12 disposed between the bearing apparatus 20 and the runner 4, ensuring a sufficient space for assembling and disassembling, and coping with various dimensional limitations on the mounting of the cooler tubes 23 within the oil tank, which tubes have to be provided for cooling heat generated from the bearing apparatus 20.

On the other hand, from the viewpoint of the vibration characteristics of the main shaft 9, the overhung dimension H should be as small as possible. Further, the use of oil as the lubricant necessitates the periodic checking and replacement of oil, thus being disadvantageous in terms of maintenance. The use of oil also necessitates the provision of the cooler tubes and makes the overall structure complicated.

In order to overcome these problems, a proposal has previously been made by Japanese Pat. Laid-Open No. 51-22954. According to this proposal, a bearing apparatus is a water-lubricated bearing apparatus to which water is supplied. This apparatus, however, encounters some problems. For instance, since an external clear water source and a device for supplying water therefrom are necessary, the bearing apparatus has a complicated structure. Further, if a natural water source is used, there is a risk of the water-lubricated surfaces being worn because water flowing into the runner at the time of a flood contains earth and sand. In order to avoid such a risk, Japanese Pat. Laid-Open No. 60-88215 discloses a bearing which is operable in water containing earth and sand without requiring any supply of clear water from the outside. This bearing is formed of new ceramic materials, which have been highlighted in recent years, and bearings of this type are used in pumps which deal with water containing earth and sand, such as drainage pumps.

The proposed bearing has an integrated journal bearing. Materials which may be used to form the journal bearing are silicon nitride, silicon carbide, etc. which, among various new ceramic materials, generate a relatively small underwater friction force and experience a relatively little wear when exposed to earth and sand. Materials which may be used to form the main shaft inserted through the journal bearing are very hard alloys, such as tungsten carbide, from the viewpoint of the resistance to earth-and-sand wear and the ease of mounting.

If a main shaft is rotated in a water containing earth and sand while the shaft is supported by a bearing, the main shaft becomes worn by earth and sand and thus has its life curtailed. With a view to lengthening the life of a main shaft, the present inventors have conducted experiments, applying a ceramic material to the main shaft. As a result, the present inventors have found that, if a ceramic material is simply used, it becomes broken, proving such application of a ceramic material to be impossible.

SUMMARY OF THE INVENTION

An object of the present invention is to provide a lubricated bearing apparatus for hydraulic machinery which is capable of preventing any breakage of ceramic sliding plates provided on the rotary side of the bearing and which is thus capable of exhibiting a long life.

According to the present invention, a lubricated bearing apparatus for hydraulic machinery has bearing ceramic sliding plates, and rotary-side ceramic sliding plates disposed in contact with the bearing-side ceramic sliding plates. The rotary-side ceramic sliding plates are disposed in receiving grooves of a main shaft sleeve member fixed to the main shaft. The main shaft sleeve member is provided with preventing portions for preventing the rotary-side ceramics sliding plates from being broken by the centrifugal force. Thus, it is made possible to use ceramic materials both on the rotary side and the bearing side, thereby lengthening the usable life of the bearing apparatus.

BRIEF DESCRIPTION OF THE DRAWINGS

FIGS. 3A to 4B illustrate ceramic segment bearings usable in the bearing apparatus shown in FIGS. 2A and 2B, wherein FIGS. 3A and 4A are perspective views of the ceramic segment bearings, and FIGS. 3B and 4B are sectional side elevations of the ceramic segment bearings shown in FIGS. 3A and 4A; and FIGS. 5A to 5D illustrate a ceramic main shaft of the bearing apparatus shown in FIGS. 2A and 2B, wherein FIG. 5A is a plan view of the ceramic main shaft, FIGS. 5B and 5C are a sectional side elevation and an exploded sectional side elevation, respectively, of the ceramic main shaft shown in FIG. 5A, and FIG. 5D is an illustration showing the operation of the ceramic main shaft shown in FIG. 5A.

DETAILED DESCRIPTION OF THE PREFERRED EMBODIMENTS

Figure 1:
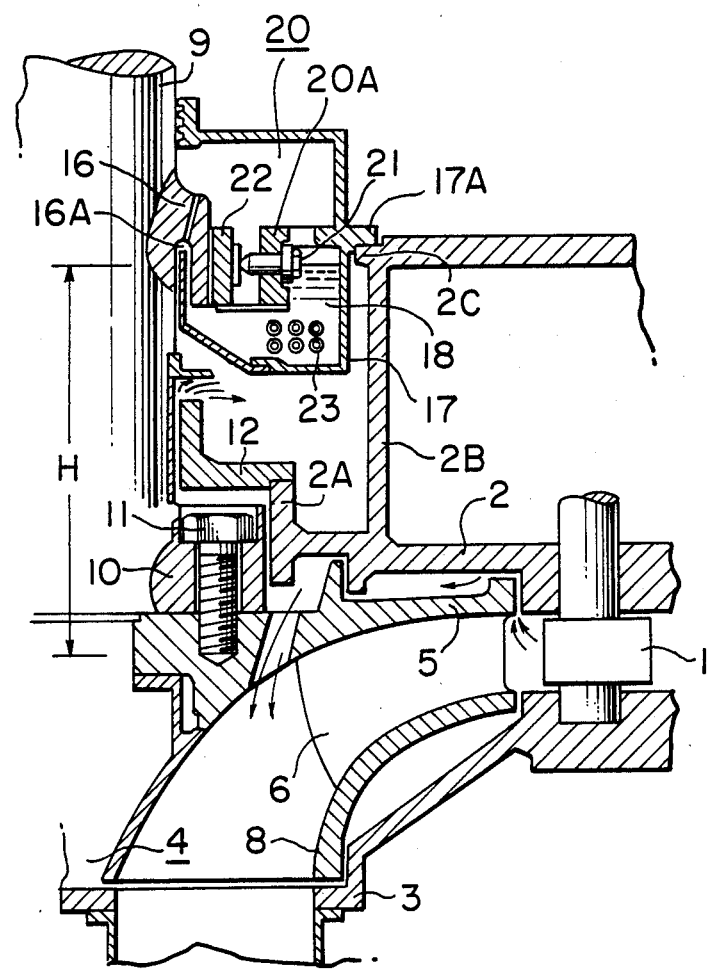
FIG. 1 is a fragmentary, sectional side elevation of a hydraulic turbine provided with a conventional bearing apparatus.

The preferred embodiments of the present invention will be described hereunder with reference to FIGS. 2A to 5D. Component parts corresponding to those shown in FIG. 1 are denoted by corresponding reference numbers and the description of those parts will be omitted.

A bearing supporting portion 30 is disposed in such a manner as to surround the outer periphery of the main shaft 9. Bolts 31 (only one of which is shown) join together the lower end of the bearing supporting portion 30 and the supporting portion 2A of the upper cover 2, while bolts 32 join together the upper end of the bearing supporting portion 30 and the water sealer 12. The water sealer 12 surrounds the main shaft 9 with a gap therebetween. Water flows through this gap in the direction X1 indicated by the arrow. A bearing apparatus 20 is disposed inside the water sealer 12 and the bearing supporting portion 30.

The bearing apparatus 20 has a ceramic segment bearing 35 and a ceramic main shaft 36 disposed in such a manner as to be rotatable relative to the ceramic segment bearing 35. The ceramic segment bearing 35 has the following construction. A plurality of threaded holes (only one of which is shown) are formed in the bearing supporting portion 30 at predetermined intervals in the circumferential direction. An adjusting bolt 21 is inserted through each threaded hole and, when the bolt 21 is rotated, it moves toward or away from the main shaft 9. The tips of the adjusting bolts 21 press against reinforcing support plates 37 with bearing ceramic sliding plates 38, with reinforcing bodies 34 provided therebetween, and the support plates 37 with the sliding plates 38 press against the ceramic main shaft 36.

Figure 3A:
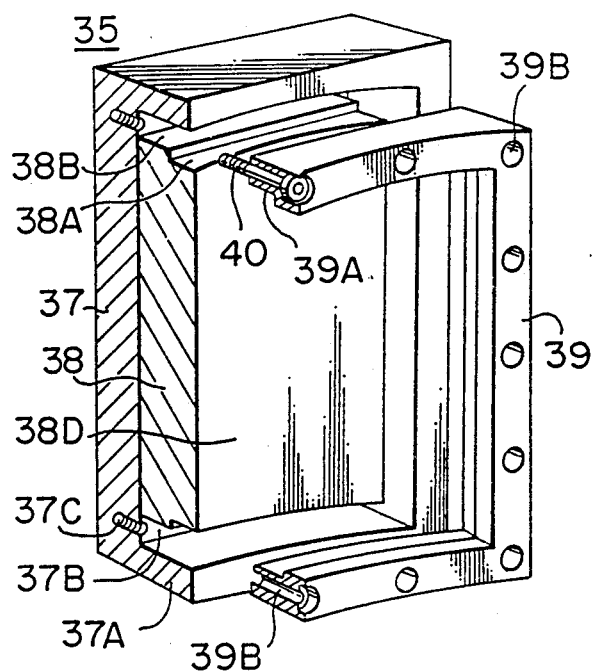
Figure 3B:
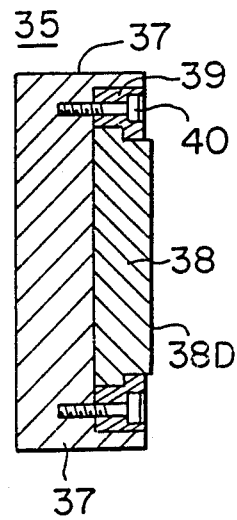
Figure 4A:
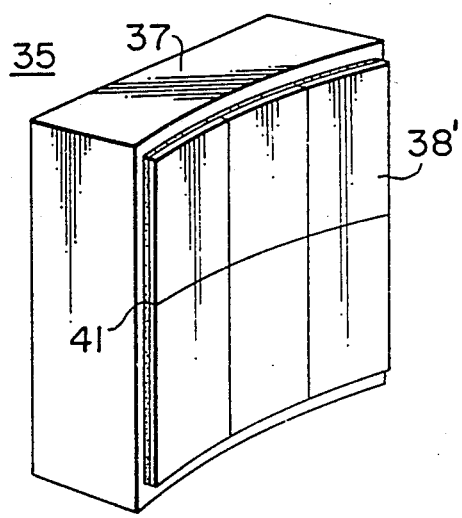
Figure 4B:
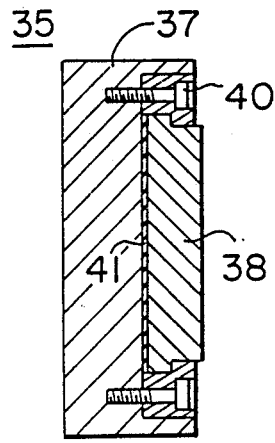

The structure of the reinforcing support plates 37 and the bearing ceramic sliding plates 38 will be described with reference to FIGS. 3A and 3B. Each reinforcing support plate 37 has a rectangular configuration and is provided with a ridge portion 37A around its periphery and with a mounting surface 37B inside the ridge portion 37A. Threaded holes 37C are formed at predetermined intervals in the portion of the mounting surface 37B that is adjacent to the ridge portion 37A. Each bearing ceramic sliding plate 38 is secured to the portion of the mounting surface 37B that is inward of the threaded holes 37C, by an adhesive. The bearing ceramic sliding plates 38 may each consist of a plurality of divided member pieces 38', as shown in FIG. 4A. Such a ceramic material as silicon nitride or silicon carbide is used as the material for forming the bearing ceramic sliding plates 38. Fixing stepped portions 38A are formed in the upper and lower surfaces of each sliding plate 38. When a holding member 39 having holding stepped portions 39A formed in the inner surface thereof is fitted into the space 38B mainly defined by the fixing stepped portions 38A and the ridge portion 37A, the holding stepped portions 39A are brought into engagement with the fixing stepped portions 38A. Thereafter, when screws 40 are inserted through threaded holes 39B formed in the holding member 39 and are then threaded into the threaded holes 37C, the bearing ceramic sliding plate 38 is secured to the reinforcing support plate 37, with the holding stepped portions 39A engaging with the fixing stepped portions 38A. In general, a ceramic material has a very strong resistance to a compression force, but it is susceptible to a bending, tensile or impact force. Therefore, as shown in FIGS. 4A and 4B, an elastic body 41 may additionally be provided between the bearing ceramic sliding plate 38 and the reinforcing support plate 37 in such a manner as to be either fastened by the holding member 39 or fixed in place by an adhesive coated on both sides of the elastic member 41. A sliding surface 38D of each bearing ceramic sliding plate 38 projects toward the main shaft 9 from the holding member 39 to be into contact with rotary-side ceramic sliding plates 42 of the ceramic main shaft 36.

The ceramic main shaft 36 has an annular main shaft sleeve member 43, and the plurality of ceramic sliding plates 42 fixed to the sleeve member 43. The main shaft sleeve member 43 is secured to the main shaft 9, with its lower edge abutting against the flange portion 10. The plurality of rotary-side ceramic sliding plates 42 are disposed around the circumference of the main shaft sleeve member 43 in such a manner as to divide the circumference. Each rotary-side ceramic sliding plate 42 is formed of the same material as that forming each bearing ceramic sliding plate 38. Details of the main shaft sleeve member 43 and the rotary-side ceramic sliding plates 42 will be explained with reference to FIGS. 5A to 5C.

The main shaft sleeve member 43 is divided into main shaft sleeve member pieces 43A and 43B. A vertically-extending ridge portion 43C is formed at one edge of the sleeve member piece 43A or 43B that abuts against the mating edge of the other sleeve member piece. Joining holes 43D are formed through the upper and lower ends of each ridge portion 43C. The outer peripheral side surfaces of the main shaft sleeve pieces 43A and 43B are formed with receiving grooves 43E. The side of each receiving groove 43E that is closer to the outer periphery is provided with preventing portions 43F1 and 43F2 which each project from the main shaft sleeve piece 43A or 43B to a part of the groove 43E. First stepped portions 43j are formed by the inner surfaces of the sleeve member 43A or 43B that correspond to the receiving groove 43E.

The outer surface of each of the plurality of rotary-side ceramic sliding plates 42 is formed with second stepped portions 42A which engage with the first stepped portions 43j.

Each rotary-side ceramic sliding plate 42 is fitted into each receiving groove 43E in the following manner. The ceramic sliding plate 42, on which an adhesive is coated, is inserted into the receiving groove 43E from the side of the groove 43E on which the projections 43F1 and 43F2 are provided. In this way, one rotary-side ceramic sliding plate 42 is inserted into one receiving groove 43E, while the first stepped portions 43j and the second stepped portions 42A are brought into engagement with each other. Thereafter, the main shaft sleeve member pieces 43A and 43B with the rotary-side ceramic sliding plates 42 are brought into contact with each other. Bolts 45A are inserted into the joining holes 43D and are then fastened by nuts 45B, thereby completing the annular main shaft sleeve member 43.

The assembly of the bearing apparatus is performed in the following manner. First, the main shaft sleeve member 43, to which the rotary-side ceramic sliding plates 42 are integrally secured, is placed around the main shaft 9. The bolts 45A are inserted into the joining holes 43D, and the nuts 45B are mounted on the bolts 45A and are then fastened, thereby joining the main shaft sleeve member pieces 43A and 43B. Subsequently, the plurality of reinforcing support plates 37, to which the bearing ceramic sliding plates 38 are integrally secured, are placed in an annular shape. The adjusting bolts 21 are rotated so that the bearing ceramic sliding plates 38 and the rotary-side ceramic sliding plates 42 are brought into press contact with each other, with the size of the radial gap between the plates 38 and the plates 42 being made uniform. To disassemble the apparatus, the above-described procedures are performed in the reverse order.

Figure 2A:
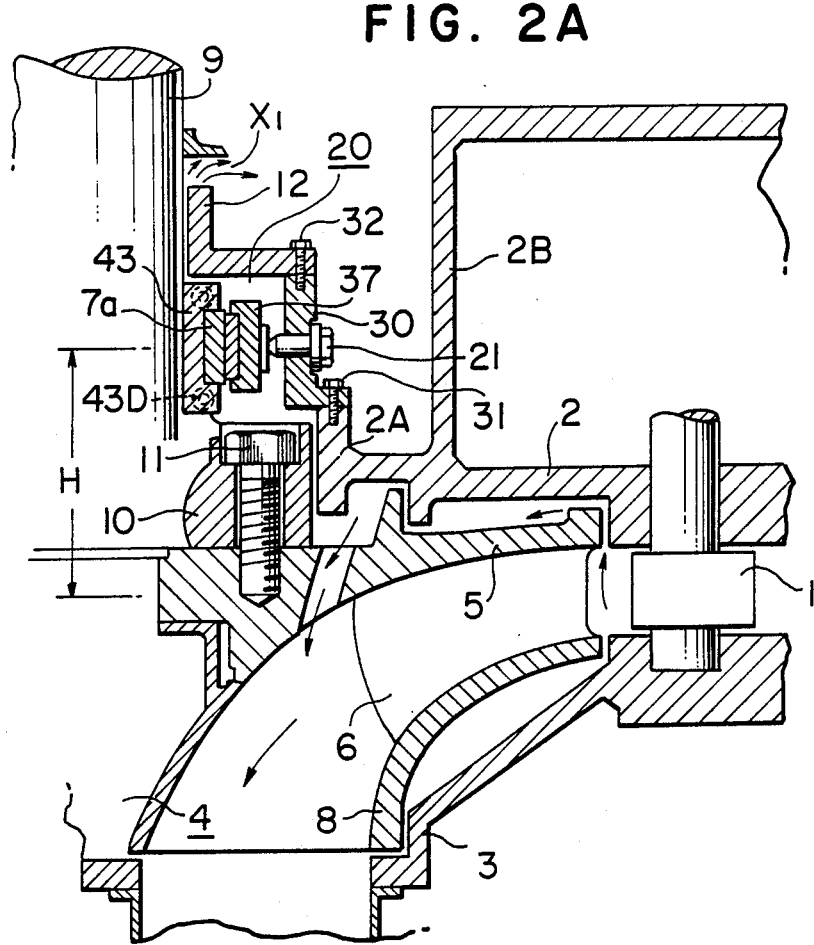
FIG. 2A is a fragmentary, sectional side elevation of a hydraulic turbine provided with a bearing apparatus in accordance with the present invention.
Figure 2B:
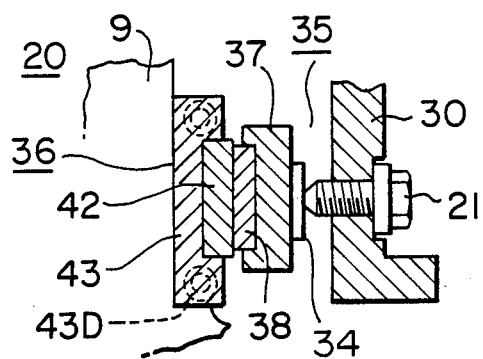
FIG. 2B is a sectional side elevation of essential parts of the apparatus shown in FIG. 2A.
Figure 5A:
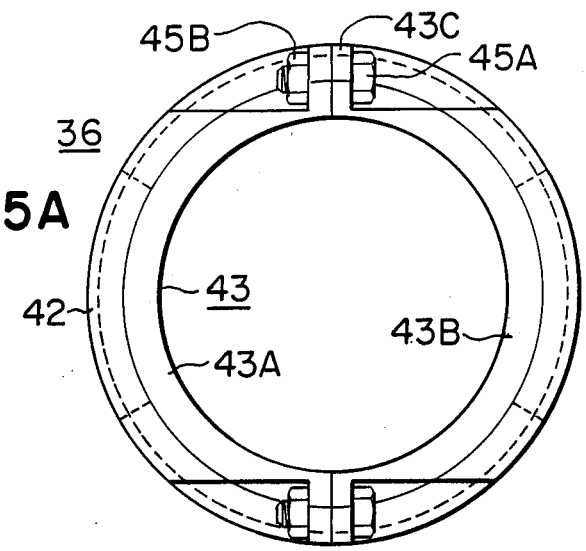
Figure 5B:
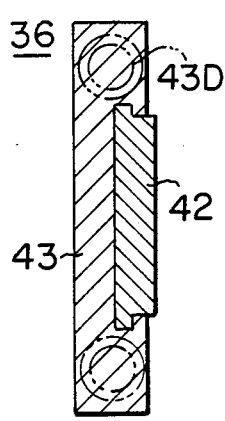
Figure 5C:
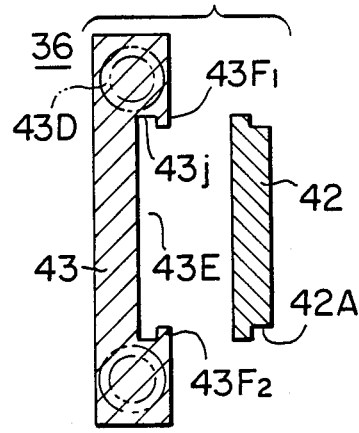
Figure 5D:
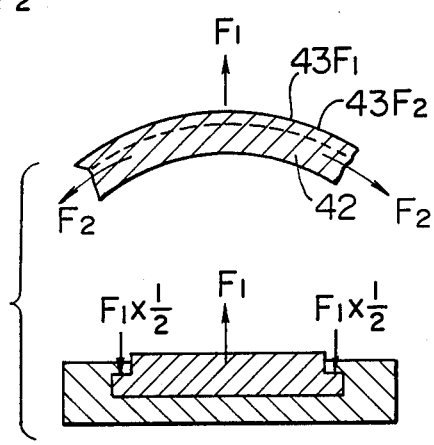

When the guide vane 1 is opened, water flows into the runner 4 in the directions indicated by the arrows in FIG. 2A, and, as the main shaft 9 rotates, the rotary-side ceramic sliding plates 42 slide on the bearing ceramic sliding plates 38. A centrifugal force F1 is exerted during this operation of the rotary-side ceramic sliding plates 42, as shown in FIG. 5D. The centrifugal force F1 causes a tensile force F2 in the circumferential direction of the rotary-side ceramic sliding plates 42. According to the present invention, the preventing portions 43F1 and 43F2 act to reduce the influence of the centrifugal force F1, thereby enabling the tensile stress F2 to be reduced by an amount corresponding to that reduction. Therefore, the rotary-side ceramic sliding plates 42 is prevented from being broken or damaged.

If, for instance, no preventing portions are provided, a large tensile stress F2 is generated by the centrifugal force F1. As a result, the rotary-side ceramic sliding plates 42 may be broken or damaged, becoming unusable. In contrast, according to the present invention, since the preventing portions 43F1 and 43F2 support the upper and lower edges of the rotary-side ceramic sliding plates 42, the tensile stress F2 is reduced to a great extent, thereby preventing the rotary-side ceramic sliding plates 42 from being broken or damaged.

Accordingly, the rotary-side ceramic sliding plates 42 and the bearing ceramic sliding plates 38 are allowed to be formed of such a ceramic material as silicon nitride or silicon carbide which is less susceptible to earth-and-sand wear, thereby making it possible to lengthen the usable life of the sliding plates 42 and 38 even if they are used in water containing earth and sand. The preventing portions may have an alternative arrangement in which the preventing portions are fitted into recesses formed on side surface of the rotary-side ceramic sliding plates 42.

Further, according to this embodiment, because the underwater bearing apparatus 20 is disposed between the runner 4 and the water sealer 12 for the main shaft 9, no device for supplying water serving as the lubricant is necessary. In addition, the overhung dimension H between the runner 4 and the center of the bearing apparatus 20 is made much smaller than that in the conventional structure. This arrangement makes it possible to prevent the risk of the outer periphery of the runner 4 from colliding with fixed portions such as the covers 2 and 3, to increase the critical speed and the strength of the main shaft 9, to prevent any one-sided wear of the bearing, to reduce the dimensions of the upper cover 2, to reduce the diameter of the main shaft 9, and to reduce the runner gap and, hence, to improve the runner efficiency.

As described above, according to the present invention, it is possible to prevent any breakage of the rotary-side ceramic sliding plates and to use ceramic sliding plates as the rotary-side and bearing sliding plates, thereby enabling these sliding plates to exhibit a prolonged usable life even if they are used in water containing earth and sand.

We claim:

1. A lubricated bearing apparatus for hydraulic machinery, comprising:
a runner mounted on the tip of the main shaft, an upper cover covering said runner, a bearing supporting plate that extends upwardly from said upper cover having threaded holes, adjusting screws inserted through said threaded holes, reinforcing support plates disposed in contact with said adjusting screws, bearing ceramic sliding plates mounted on said reinforcing support plates, at least one rotary-side sliding plate disposed in contact with said bearing ceramic sliding plates, and a main shaft sleeve member that is mounted on the main shaft and to which said rotary-side sliding plate is fixed, said adjusting screw being rotatable to bring said bearing ceramic sliding plates into press contact with said rotary-side sliding plate;

said rotary-side sliding plate being a rotary-side ceramic sliding plate formed of a ceramic material;

engagement portions in one side surface of said rotary-side ceramic sliding plate, at least one receiving groove in an outer peripheral surface of said main shaft sleeve member for receiving said rotary-side ceramic sliding plate, and said main shaft sleeve member having preventing portions partially extending across said receiving groove for engaging said engagement portions.

2. A lubricated bearing apparatus for hydraulic machinery, comprising: a runner mounted on the tip of a main shaft, an upper cover covering said runner, a bearing supporting plate that extends upwardly from said upper cover, said supporting plate having threaded holes, adjusting screws inserted through said threaded holes, reinforcing support plates disposed in contact with said adjusting screws, bearing ceramic sliding plates mounted on said reinforcing support plates, at least one rotary-side sliding plate disposed in contact with said bearing ceramic sliding plates, and a main shaft sleeve member which is mounted on the main shaft and to which said rotary-side sliding plate is fixed, said adjusting screws being rotatable to bring said bearing ceramic sliding plates into press contact with said rotary-side sliding plate;

said rotary-side sliding plate being a rotary-side ceramic sliding plate formed of a plurality of divided ceramic material plates;

engagement portions in one side surface of each of said rotary-side ceramic sliding plate having opposite end portions that are lower in height than a center portion thereof;

said main shaft sleeve member being divided into at least one pair of main shaft sleeve member pieces, each having an outer peripheral surface; each of said main shaft sleeve member pieces having a receiving groove in the outer peripheral surface and preventing portions projecting along a side of the receiving groove into a part of the receiving groove such that said receiving groove receives a plurality of the rotary-side ceramic sliding plates and the engagement portions of the rotary-side ceramic sliding plates engage the preventing portions of the main shaft sleeve member pieces; and means for fastening each said main shaft sleeve member piece integrally together.

3. A lubricated bearing apparatus for hydraulic machinery according to claim 2, further comprising said plurality of rotary-side ceramic sliding plates being positioned in the circumferential direction with respect to the main shaft.

4. A lubricated bearing apparatus for hydraulic machinery according to claim 2, wherein opposite end portions are stepped portions having a smaller diametrical dimension on the radially outer side than on the radially inner side thereof, said stepped portions being engaged with said preventing portions.

5. A lubricated bearing apparatus for hydraulic machinery according to claim 2, wherein said fastening means further comprises said at least a pair of main shaft sleeve member pieces having mating edges, projections formed on the mating edges, and holes formed through said projections, and means inserted through said holes when said main shaft sleeve member pieces are in contact with each other for integrating said main shaft sleeve member pieces together to form said main shaft sleeve member.

6. A lubricated bearing apparatus for hydraulic machinery according to claim 5, further comprising elastic members disposed between said reinforcing support plates and said bearing ceramic sliding plates.

7. A lubricated bearing apparatus for hydraulic machinery according to claim 2, further comprising: a ridge portion formed around the periphery of each of said reinforcing support plates, each of said bearing ceramic sliding plates being fixed to each of said reinforcing support plates within said ridge portion; bearing-side stepped portions formed in side surfaces of each of said bearing ceramic sliding plates; holding supporting plates which are disposed between said bearing-side stepped portions and said ridge portion and which each have holding stepped portions engaging with said bearing-side stepped portions; and fastening means fastening together said holding supporting plates and said reinforcing support plates.

8. A lubricated bearing apparatus for hydraulic machinery according to claim 2, further comprising elastic members disposed between said reinforcing support plates and said bearing ceramic sliding plates.

9. A lubricated bearing apparatus for hydraulic machinery according to claim 2, wherein water flows through said bearing apparatus.

* * * * *